(12) United States Patent
Kubota et al.

(10) Patent No.: US 11,535,076 B2
(45) Date of Patent: Dec. 27, 2022

(54) DAMPER MOUNT ATTACHMENT STRUCTURE AND DAMPER MOUNT

(71) Applicant: HONDA MOTOR CO., LTD., Tokyo (JP)

(72) Inventors: Tomoaki Kubota, Wako (JP);
Yasufumi Nakajima, Wako (JP);
Takashi Okazaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/289,482

(22) PCT Filed: Sep. 19, 2019

(86) PCT No.: PCT/JP2019/036659
§ 371 (c)(1),
(2) Date: Apr. 28, 2021

(87) PCT Pub. No.: WO2020/090273
PCT Pub. Date: May 7, 2020

(65) Prior Publication Data
US 2021/0387494 A1    Dec. 16, 2021

(30) Foreign Application Priority Data

Oct. 30, 2018  (JP) .............................. JP2018-204212
Oct. 30, 2018  (JP) .............................. JP2018-204213

(51) Int. Cl.
*B60G 15/06*    (2006.01)
*B60G 13/00*    (2006.01)

(52) U.S. Cl.
CPC ......... *B60G 15/067* (2013.01); *B60G 13/003* (2013.01); *B60G 2204/128* (2013.01); *B60G 2206/8207* (2013.01)

(58) Field of Classification Search
CPC ................ B60G 15/067; B60G 13/003; B60G 2204/128; B60G 2206/8207; B60G 7/00; B60G 2204/10; F16F 9/54; F16F 9/38
(Continued)

(56) References Cited

U.S. PATENT DOCUMENTS 5,342,139 A * 8/1994 Hoffman ................ B60G 11/28
267/64.23
5,431,363 A * 7/1995 Ezzat .................... B62D 25/088
248/562

(Continued)

FOREIGN PATENT DOCUMENTS

EP        2110273 A1    10/2009
JP       H03-108511 U    11/1991
(Continued)

OTHER PUBLICATIONS

Written Opinion of the International Searching Authority for International Application No. PCT/JP2019/036659 (Year: dated 2021).*

(Continued)

*Primary Examiner* — Robert A. Siconolfi
*Assistant Examiner* — James K Hsiao
(74) *Attorney, Agent, or Firm* — Rankin, Hill & Clark LLP

(57) ABSTRACT

A damper mount structure improves accuracy of positioning to increase assembling efficiency and includes a damper mount for fixing an upper portion of a suspension device to an attachment opening formed in a vehicle body. The damper mount includes: a housing to be mounted on the upper portion of the suspension device; a stay which protrudes from an outer circumferential surface of the housing and is brought in contact with a lower surface of a circumferential edge of the attachment opening in a state that the housing has been inserted through the attachment opening to (Continued)

attach the housing to the circumferential edge of the attachment opening; and a plurality of ribs which connect the stay with an outer circumferential surface of the housing. A first rib, a second rib, and a third rib include side surfaces, respectively, facing an inner circumferential surface of the attachment opening.

8 Claims, 13 Drawing Sheets

(58) Field of Classification Search
USPC .......................................................... 267/220
See application file for complete search history.

(56) References Cited

U.S. PATENT DOCUMENTS

| | | | | |
|---|---|---|---|---|
| 6,155,543 | A * | 12/2000 | Solomond | B60G 15/068 267/216 |
| 6,572,089 | B2 * | 6/2003 | Zietsch | B60G 13/003 267/195 |
| 6,640,942 | B2 * | 11/2003 | Wakita | F16F 9/54 188/321.11 |
| 7,311,181 | B2 * | 12/2007 | Germano | B60G 15/068 280/124.147 |
| 8,336,686 | B2 * | 12/2012 | Handke | B60G 15/067 188/297 |
| 8,505,887 | B2 * | 8/2013 | Harden | F16F 1/376 280/124.1 |
| 8,939,439 | B2 * | 1/2015 | Corbett | B60G 15/068 384/609 |
| 9,010,741 | B2 * | 4/2015 | Viault | F16C 33/761 384/617 |
| 9,242,677 | B2 * | 1/2016 | Kim | B62D 25/088 |
| 9,802,454 | B2 * | 10/2017 | Wilkin | B60G 15/063 |
| 9,849,746 | B2 * | 12/2017 | Wilkin | B60G 15/063 |
| 9,873,303 | B2 * | 1/2018 | Broeckx | B60G 15/062 |
| 10,618,366 | B2 * | 4/2020 | Pniewski | F16F 9/3207 |
| 2003/0178269 | A1 * | 9/2003 | Hayashi | F16F 1/3814 188/321.11 |
| 2005/0063630 | A1 * | 3/2005 | Handke | F16F 9/38 384/617 |
| 2006/0054436 | A1 * | 3/2006 | Handke | B60G 15/067 188/321.11 |
| 2011/0135867 | A1 * | 6/2011 | Cook | B32B 15/095 428/160 |
| 2013/0277898 | A1 * | 10/2013 | Vartolo | B60G 13/003 267/66 |
| 2014/0049019 | A1 * | 2/2014 | Ahn | B62D 21/09 280/124.155 |
| 2014/0097590 | A1 * | 4/2014 | Yoo | B60G 15/00 280/124.155 |
| 2015/0158363 | A1 * | 6/2015 | Patil | B60G 11/22 267/220 |
| 2015/0328947 | A1 * | 11/2015 | Kawahara | F16F 9/3207 267/221 |
| 2016/0084336 | A1 * | 3/2016 | Tsunekawa | F16F 9/585 188/322.12 |
| 2016/0214453 | A1 * | 7/2016 | Tanahashi | F16F 9/46 |
| 2017/0028804 | A1 * | 2/2017 | Lindemann | F16F 1/12 |
| 2017/0080983 | A1 * | 3/2017 | Kowaki | B62D 25/088 |
| 2019/0170205 | A1 * | 6/2019 | Wichary | F16F 9/18 |
| 2019/0186585 | A1 * | 6/2019 | Akiyama | B60G 13/003 |

FOREIGN PATENT DOCUMENTS

| | | |
|---|---|---|
| JP | 2001063332 A | 3/2001 |
| JP | 2001193781 A | 7/2001 |
| JP | 2002019440 A | 1/2002 |
| JP | 2006316864 A | 11/2006 |
| JP | 2019137355 A | 8/2019 |

OTHER PUBLICATIONS

International Search Report by ISA/JP dated Nov. 12, 2019, on PCT/JP2019/036659, 2 pages.
Written Opinion by ISA/JP dated Nov. 12, 2019, on PCT/JP2019/036659, 5 pages.

* cited by examiner

X–X

XI–XI

US 11,535,076 B2

DAMPER MOUNT ATTACHMENT STRUCTURE AND DAMPER MOUNT

TECHNICAL FIELD

The present invention relates to a damper mount attachment structure and a damper mount.

BACKGROUND ART

In a damper mount attachment structure of a conventional art, bolts are provided through an upper bracket of a damper. Further, bolt holes are formed in an upper wall of a tire house body in a tire house. In a state that the bolts are inserted into the bolt holes, ends of the bolts are fastened by nuts. This allows an upper portion of the damper to be attached to the upper wall of the tire house body (see, Patent Document 1 and the like, for example).

With the damper mount attachment structure described above, when the upper portion of the damper is attached to the upper wall of the tire house body, the bolts are aligned with the bolt holes to be inserted therein.

CITATION LIST

Patent Document 1: Japanese Patent Application Publication No. 2002-19440
Patent Document 2: Japanese Patent Application Publication No. 2006-316864

SUMMARY OF THE INVENTION

Problems to Be Solved

However, in the conventional damper mount attachment structure, when the damper has a position gap with respect to a vehicle body, it is difficult to insert the bolts into the bolt holes, to have a problem in fastening the bolts.

The present invention is intended to provide a damper mount attachment structure and a damper mount to improve accuracy of positioning to increase assembling efficiency.

Solution to Problem

A damper mount structure of the present invention includes a damper mount for fixing an upper portion of a suspension to an attachment opening formed in a vehicle body. The damper mount includes: a base to be mounted on the upper portion of the suspension; an attachment portion which protrudes from an outer circumferential surface of the base and is brought in contact with a lower surface of a circumferential edge of the attachment opening in a state that the base has been inserted through the attachment opening to attach the base to the circumferential edge of the attachment opening; and a rib which connects the attachment portion with an outer circumferential surface of the base. The rib includes a side surface facing an inner circumferential surface of the attachment opening.

Further, the damper mount includes a plurality of ribs which bulge radially outward from an outer circumference of the base and extend from an upper portion of the outer circumference of the base to the attachment portion, and a channel forming recess which is formed at a boundary between the base and the attachment portion, wherein the channel forming recess is continuously formed from a rib of the plurality of ribs located in the center to adjacent ribs located on a right side and a left side.

Advantageous Effects of the Invention

The present invention provides a damper mount attachment structure and a damper mount to improve accuracy of positioning so as to increase assembling efficiency.

EMBODIMENTS OF THE INVENTION

First Embodiment

A description is given of a first embodiment (damper mount attachment structure) of the present invention with reference to the drawings as appropriate. The same elements are denoted by the same symbols, and duplicate descriptions are omitted. When directions are described, a front/rear (longitudinal) direction, a right/left direction, and an up/down (vertical) direction are basically based on those as viewed from a driver, unless otherwise noted. Further, a "width direction" indicates the "right/left direction".

Figure 1:
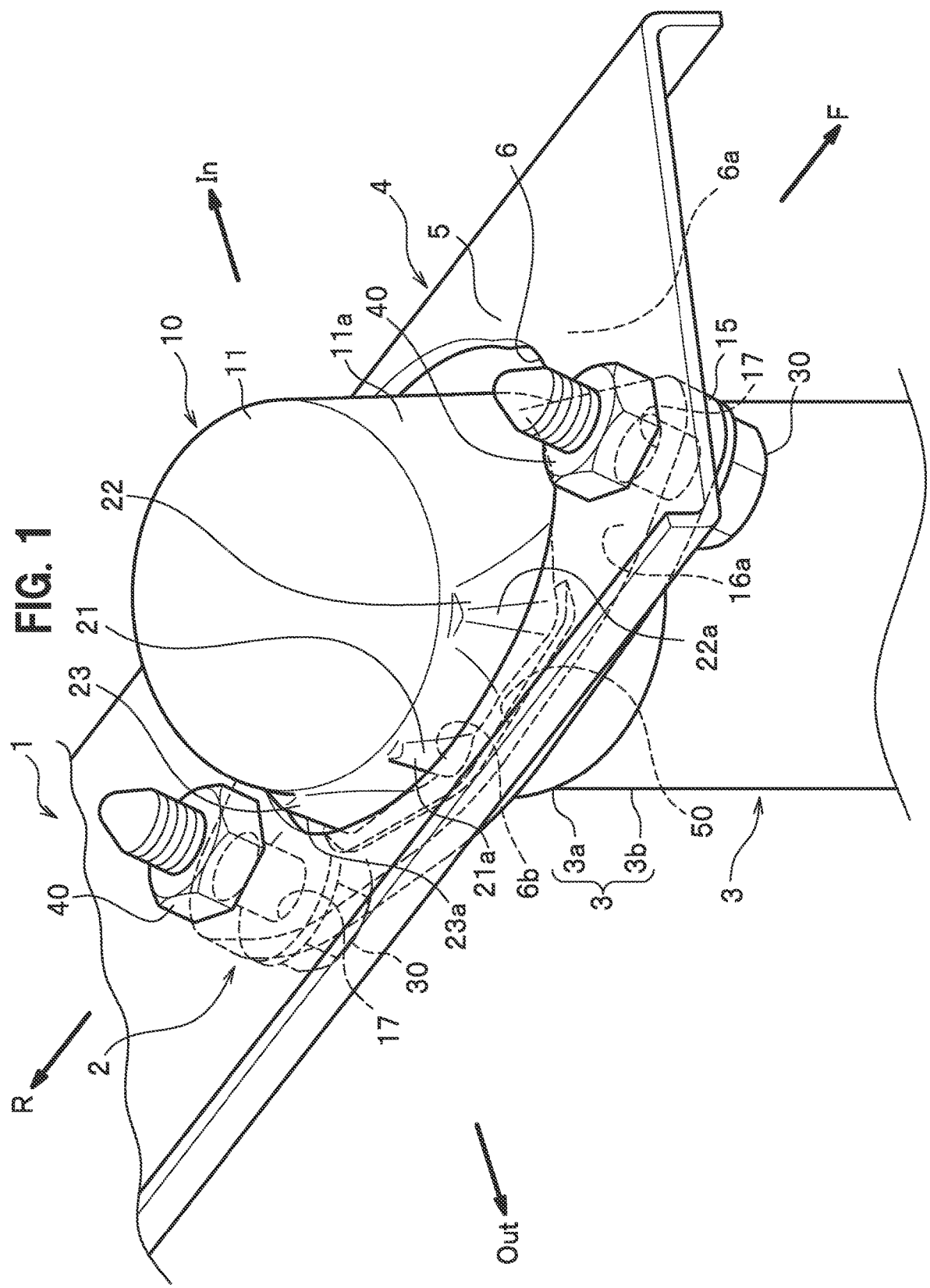
FIG. 1 is an overall perspective view illustrating a damper mount attachment structure according to a first embodiment of the present invention, in which a damper mount is mounted on a suspension attachment of a vehicle body.

As illustrated in FIG. 1, a damper mount attachment structure of the first embodiment includes a suspension attachment 2 of a vehicle body 1, a suspension device 3, and a damper mount 10 mounted on an upper portion 3a of the suspension device 3 to attach the suspension device 3 to the suspension attachment 2.

In the first embodiment, a description is given of the damper mount attachment structure of the suspension device 3 used for a right front wheel of the vehicle body 1. Note that the damper mount attachment structure of the suspension device 3 applied to each of a left front wheel, a right rear wheel, and a left rear wheel is the same as or equivalent to that of the suspension device 3 used for the right front wheel, and thus descriptions thereof are omitted.

The suspension attachment 2 of the first embodiment includes a seat surface 5. The seat surface 5 is formed to incline inward in the width direction on an upper portion of each of a pair of right and left tire house bodies 4, which is arranged in the width direction of the vehicle body 1.

The seat surface 5 is formed with an attachment opening 6 and a pair of bolt fastening holes 7. The attachment opening 6 circularly opens at the center of an upper part. The bolt fastening holes 7 are formed to open on opposite sides to have the attachment opening 6 therebetween in the longitudinal direction.

The suspension devices 3 are arranged in right and left wheel houses of the vehicle body 1, each including a coil spring (not shown), a shock absorber as a damping member, and the like.

The shock absorber includes a cylindrical damper tube 3b accommodated with a shock absorber body. Further, a piston rod, which expands and contracts in an inserting/removing direction, protrudes from an upper end of the damper tube 3b. Still further, a lower portion of the damper tube 3b is connected to a portion such as a knuckle arm (not shown) which moves relative to the vehicle body 1.

Figure 2:
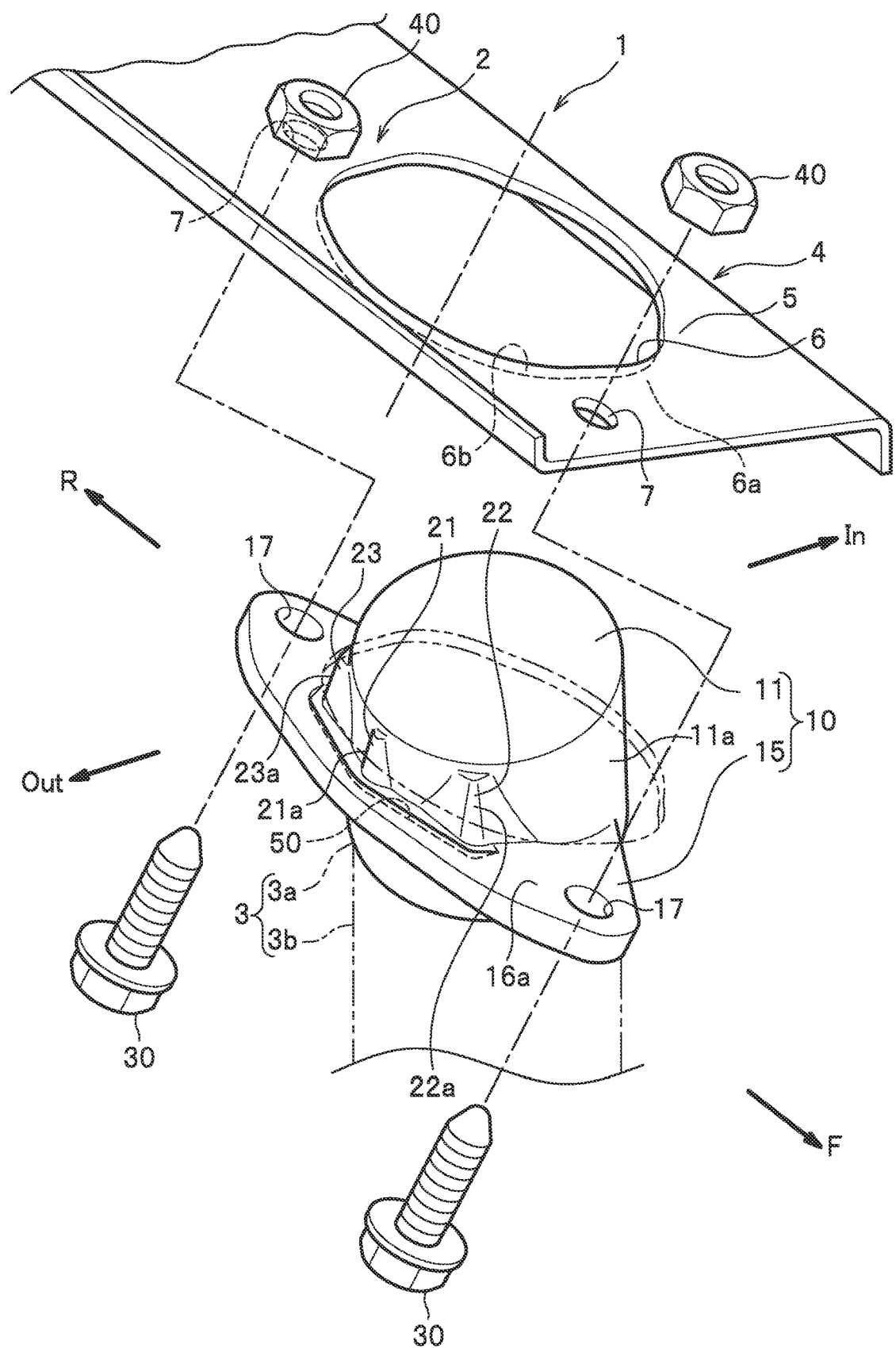
FIG. 2 is a perspective view of the damper mount attachment structure, in which the damper mount is to be mounted on the suspension attachment of the vehicle body.

As illustrated in FIG. 2, the damper mount 10 is mounted on the upper portion of the suspension device 3 at an end of the piston rod protruding upward from an upper end of the damper tube 3b.

The damper mount 10 includes a housing 11 as a base to be mounted on the upper portion 3a of the suspension device 3 and a stay 15 as an attachment portion integrally protruding from an outer circumferential surface 11a of the housing 11.

Figure 7:
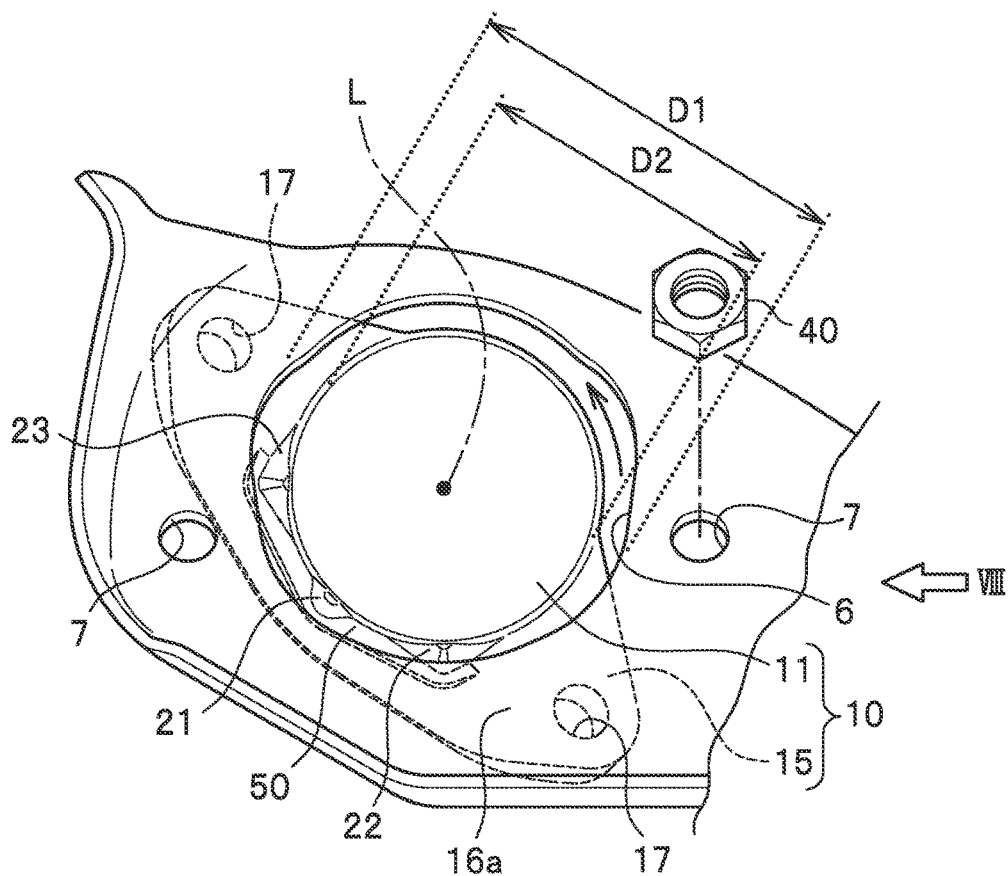
FIG. 7 is a top view of the damper mount attachment structure, in which the damper mount is to be mounted on the suspension attachment of the vehicle body.

An inner diameter D1 of the attachment opening 6 of the vehicle body 1 is set to be larger than an outer diameter D2 of the housing 11 of the damper mount 10 (see FIG. 7).

The housing 11 of the damper mount 10 is inserted through the attachment opening 6 to have the stay 15 brought in contact with a lower surface 6a of a circumferential edge of the attachment opening 6 for attachment. Thus, the upper portion of the suspension device 3 is mounted on the vehicle body 1 to absorb and relax a load vertically inputted to the vehicle.

FIGS. 3 to 6 illustrate a structure of the damper mount 10 according to the first embodiment.

The damper mount 10 of the first embodiment includes the cylindrical housing 11.

Figure 3:
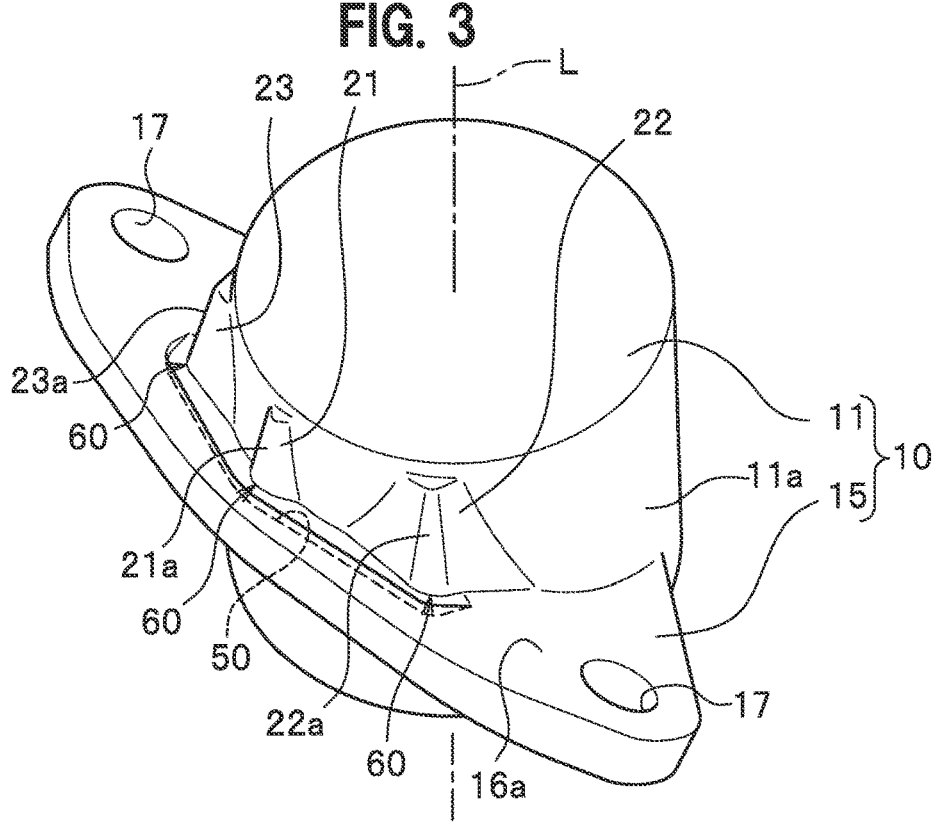
FIG. 3 is a perspective view of the damper mount used for the damper mount attachment structure.

As illustrated in FIG. 3, the outer circumferential surface 11a of the housing 11 is formed with a first rib 21, a second rib 22, and a third rib 23 (hereinbelow, also described as the first rib 21 to third rib 23) which continuously connect the stay 15 with the outer circumferential surface 11a of the housing 11.

Figure 11:
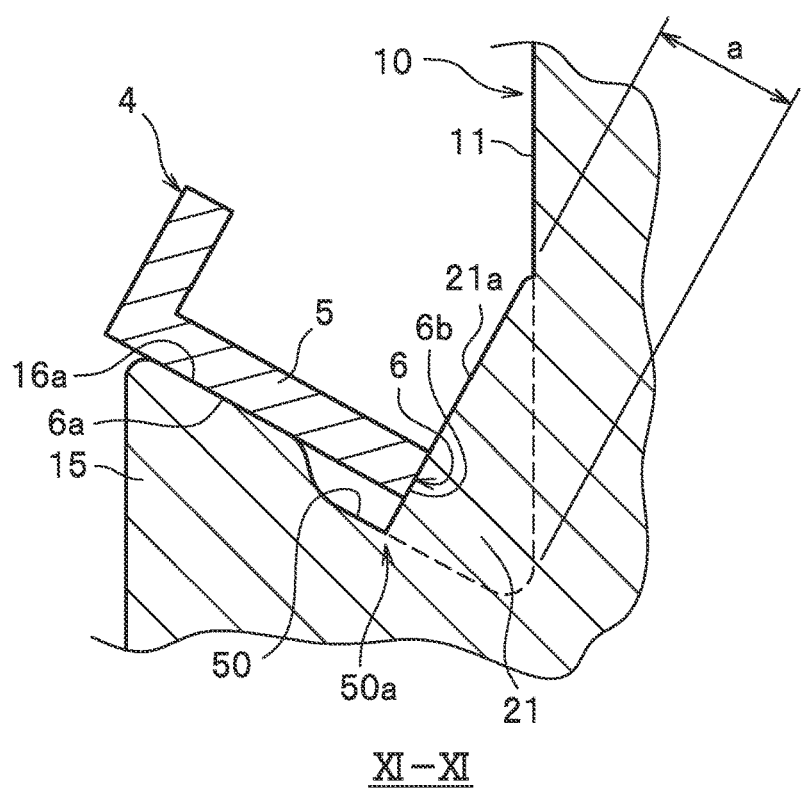
FIG. 11 is a cross-sectional view taken along a line XI-XI in FIG. 9, in which an inner circumferential surface at a circumferential edge of an attachment opening does not hit an R-portion due to a recess, in a state that the damper mount has been mounted.

The first rib 21 to third rib 23 protrude outward in a radial direction of the housing 11 and have side surfaces 21a, 22a, and 23a, respectively, to face, so as to be in parallel here with, an inner circumferential surface 6b of the attachment opening 6 (see FIG. 11).

The side surfaces 21a, 22a, 23a of the damper mount 10 respectively to face the inner circumferential surface 6b of the attachment opening 6 each extend radially outward from the outer circumferential surface 11a, vertically spreading toward the stay 15, to have a shape tapered at an angle intersecting an axis L of the housing 11.

The side surfaces 21a, 22a, 23a are each formed to linearly incline with predetermined width dimensions.

Figure 4:
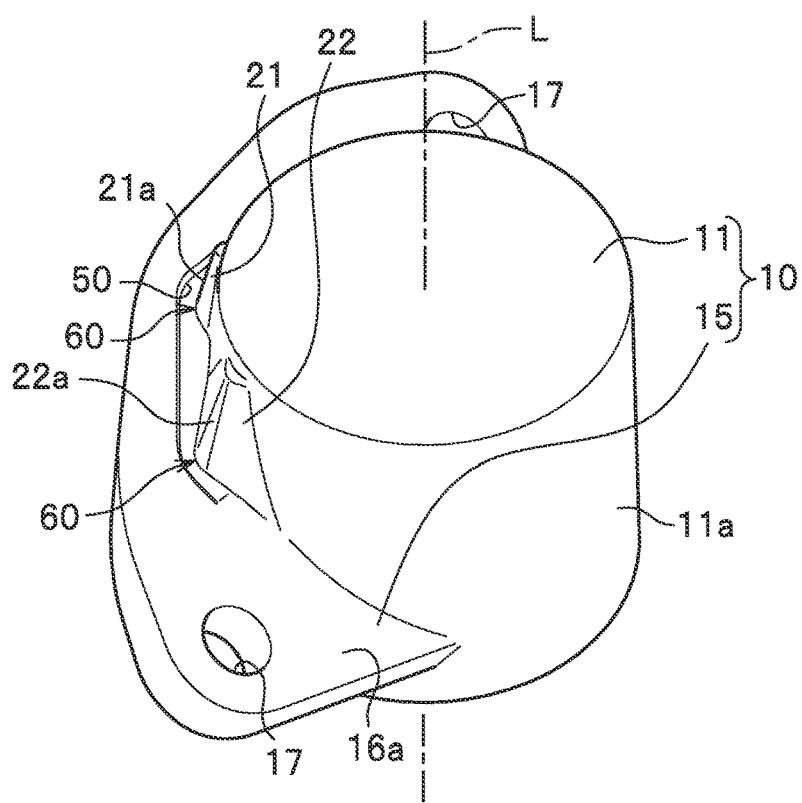
FIG. 4 is a perspective view of the damper mount as viewed from another direction.

Further, as illustrated in FIG. 4, a flat contact surface 16a and a recess 50 formed by recessing the flat contact surface 16a therefrom downward are formed on an upper surface of the stay 15.

The recess 50 has a dogleg shape (see FIG. 6) along the outer circumferential surface 11a, as viewed from above, across the first rib 21, second rib 22, and third rib 23. An intersection 50a between each of the side surfaces 21a, 22a, 23a and the contact surface 16a is located in the recess 50 of the contact surface 16a of the stay 15 (see FIG. 11).

Figure 5:
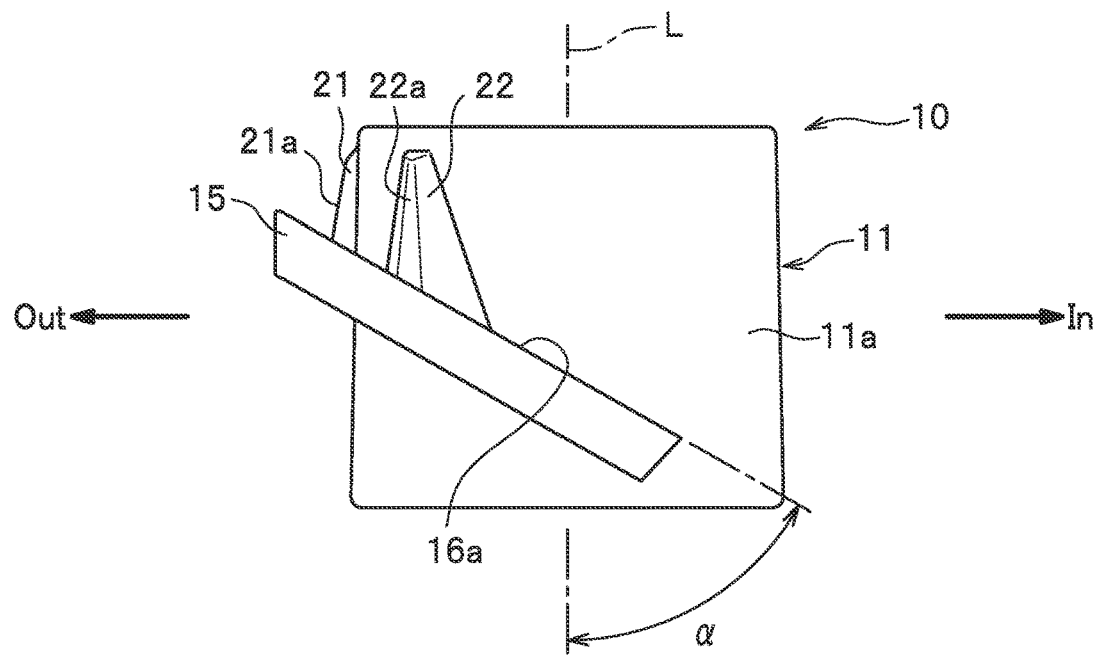
FIG. 5 is a side view of the damper mount.

As illustrated in FIG. 5, the contact surface 16a formed on the upper surface of the stay 15 is formed to be flat and inclined at a predetermined angle α (0 to 90°) with respect to the axis L of the housing 11. Therefore, even when an angle about the axis L is deviated, the damper mount 10 is pushed from below to follow the inclination, making the housing 11 rotate so that the bolt insertion holes 17 are aligned with the corresponding bolt fastening holes 7, respectively. Accordingly, the contact surface 16a is brought in surface contact with the lower surface 6a of the circumferential edge of the attachment opening 6.

Figure 6:
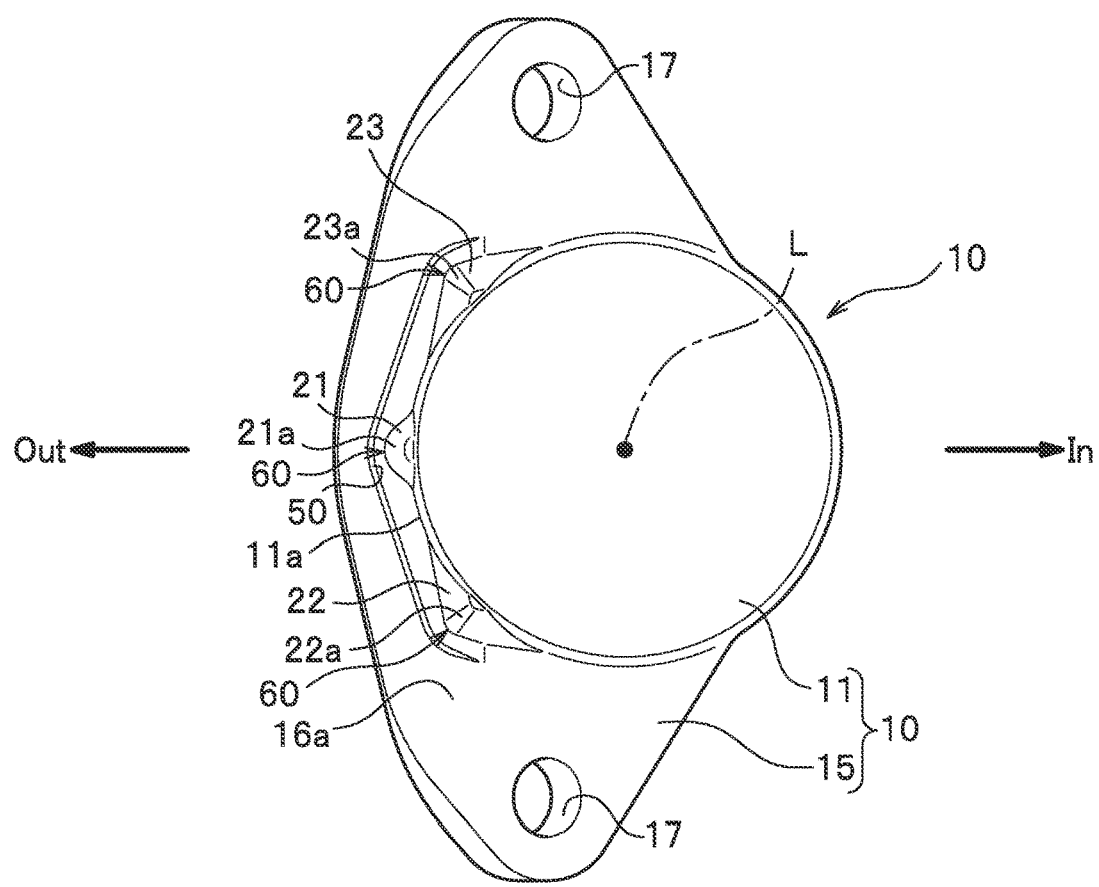
FIG. 6 is a top view of the damper mount.

As illustrated in FIG. 6, the contact surface 16a has the bolt insertion holes 17. The bolt insertion holes 17 are formed to be open so as to correspond to the bolt fastening holes 7 formed in the seat surface 5, respectively. The bolt insertion holes 17 and the bolt fastening holes 7 may be formed at any positions around the attachment opening 6.

In a state that the contact surface 16a has been brought in contact with the lower surface 6a, bolts 30 as fastening members are inserted into the bolt fastening holes 7 and the bolt insertion holes 17 (see FIG. 2). The bolts 30 are screwed by nuts 40 arranged on an upper surface of the seat surface 5. The bolts 30 are screwed by the nuts 40 so that the upper portion 3a of the suspension device 3 is fixed to the vehicle body 1 (see FIG. 1).

Further, as illustrated in FIG. 6, the first rib 21 to third rib 23 are formed on an outer side in the width direction with respect to the axis L of the housing 11, respectively. The first rib 21, second rib 22, and third rib 23 have the inclined side surfaces 21a, 22a, and 23a forming surfaces to face to the inner circumferential surface 6b of the attachment opening 6. Further, the side surfaces 21a, 22a, 23a in the first embodiment each present a tapered shape and are connected with each other between the outer circumferential surface 11a and the contact surface 16a.

Figure 9:
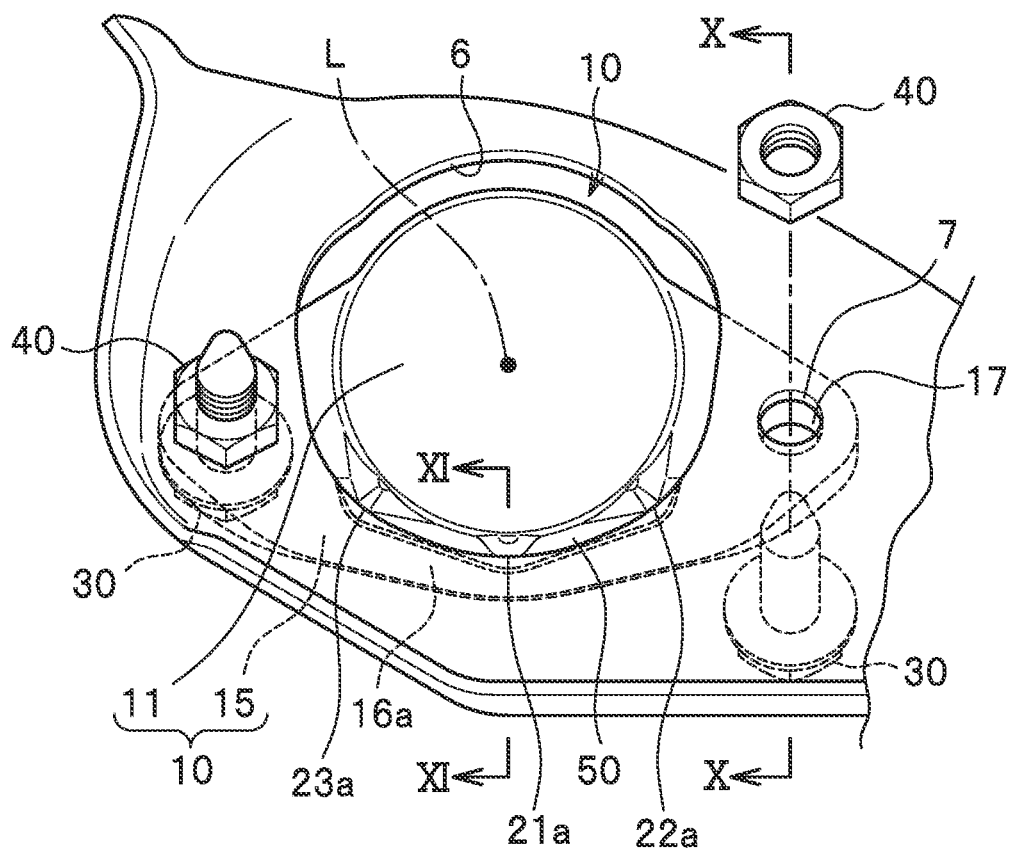
FIG. 9 is a top view of the damper mount attachment structure, in which the damper mount is positioned and attached.

Further, as illustrated in FIG. 9, the first rib 21 to third rib 23 in the first embodiment are formed on the outer circumferential surface 11a at predetermined intervals. Still further, the second rib 22 and the third rib 23 are formed in pair in the longitudinal direction having the first rib 21 therebetween at the same distance therefrom.

Figure 10:
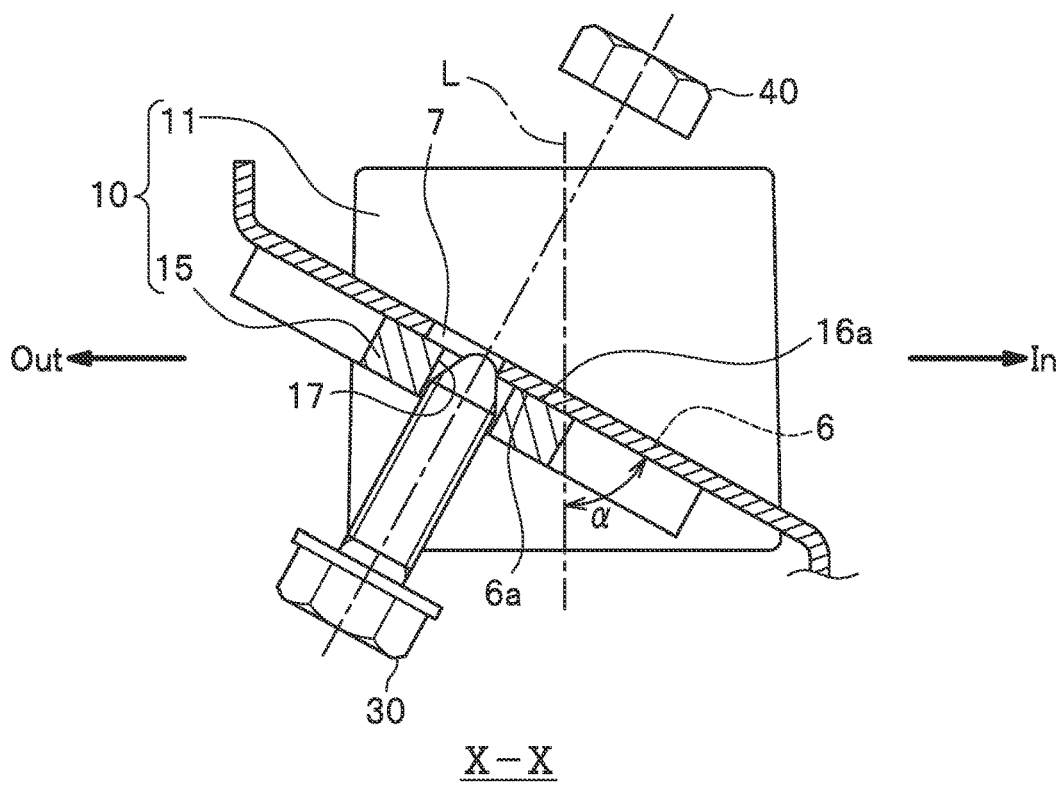
FIG. 10 is a cross-sectional view taken along the line X-X in FIG. 9, in which bolts are inserted into bolt holes aligned with each other.

As illustrated in FIG. 10, the contact surface 16a of the first embodiment is inclined at the angle α to diagonally intersect the axis L of the housing 11.

The contact surface 16a is formed to incline downward and inward (In direction) in the width direction at the same angle α as the lower surface 6a of the seat surface 5 of the suspension attachment 2 (see FIG. 10).

Next, a description is given of advantageous effects of the damper mount attachment structure of the first embodiment.

The damper mount attachment structure of the first embodiment formed as described above improves accuracy of positioning to increase assembling efficiency.

That is, when the upper portion 3a of the suspension device 3 is attached to the suspension attachment 2 of the vehicle body 1, the housing 11 is inserted from the lower surface 6a of the seat surface 5 upward of the vehicle, as illustrated in FIG. 2.

Figure 8:
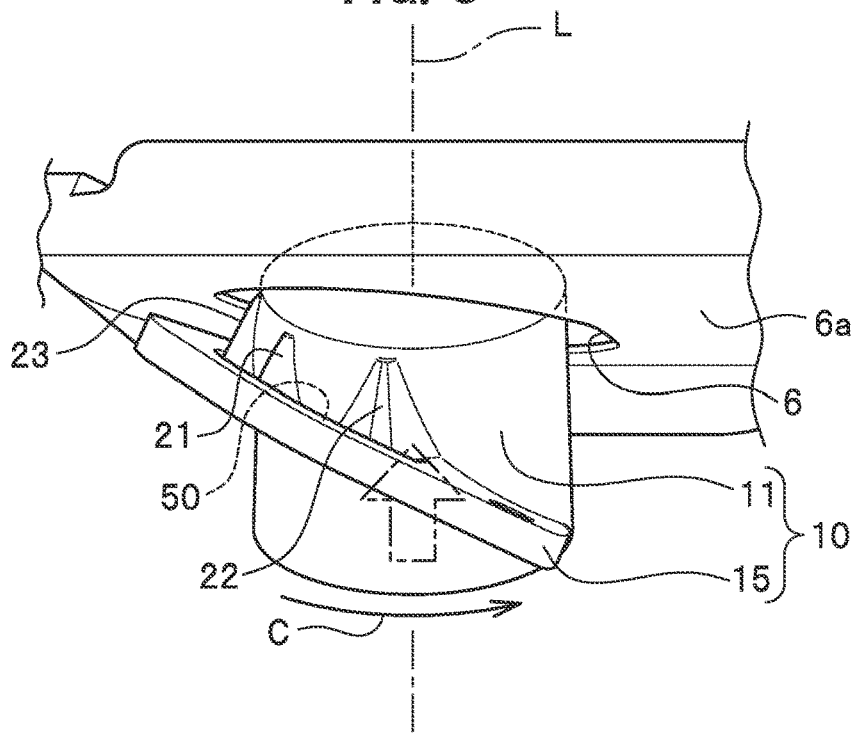
FIG. 8 is a side view of the damper mount attachment structure, in which the damper mount is rotated, as viewed from a direction VIII in FIG. 7.

As illustrated in FIG. 7, the inner diameter D1 of the attachment opening 6 is larger than the outer diameter D2 of the housing 11 so that the housing 11 can be vertically inserted into the attachment opening 6 (see FIG. 8). The side surface 21a of the first rib 21, the side surface 22a of the second rib 22, and the side surface 23a of the third rib 23 are formed to face the inner circumferential surface 6b of the attachment opening 6.

Therefore, when the housing 11 is inserted into the attachment opening 6, each of the side surfaces 21a, 22a, 23a slides on the inner circumferential surface 6b of the attachment opening 6 to guide the housing 11 to a desired mounting position.

Thus, the accuracy of positioning is improved so that the bolts 30 are easily inserted through the bolt insertion holes 17 toward the bolt fastening holes 7 (see FIG. 10) so as to be screwed by the nuts 40.

As described above, the upper portion 3a of the suspension device 3 is guided to the desired position for attachment to the vehicle body 1, as illustrated in FIG. 1. Therefore, the assembling efficiency when the suspension device 3 is attached is improved.

Further, in the first embodiment, the side surfaces 21a, 22a, 23a, facing the inner circumferential surface 6b of the attachment opening 6, are formed to linearly incline with predetermined width dimensions at an angle intersecting the axis L of the housing 11.

Thus, the side surfaces 21a, 22a, 23a each protrude radially outward from the outer circumferential surface 11a, vertically spreading toward the stay 15, to incline with predetermined width dimensions at an angle intersecting the axis L of the housing 11, and the intersection 50a is located in the recess 50 (see FIG. 11).

Therefore, even in a state that the lower surface 6a has been brought in contact with the contact surface 16a, a corner between the lower surface 6a and the inner circumferential surface 6b does not hit an R-portion formed at an internal corner closer to the vehicle body, to prevent a position gap. Further, when being arranged to be in parallel with the contact surface 16a, the lower surface 6a is always brought in surface contact with the contact surface 16a.

Accordingly, an amount of a position gap is intentionally adjusted so that accuracy of positioning is further improved.

Further, a newly formed portion such as a receiving surface (cut and raised surface), which is to be separately processed on the circumferential edge of the attachment opening 6 closer to the vehicle body 1, is not required. Thus, only the housing 11 needs to be processed, to facilitate manufacturing.

Further, as illustrated in FIG. 6, the first rib 21 to third rib 23 are formed on an outer side in the width direction with respect to the axis L of the housing 11, respectively.

As illustrated in FIG. 9, in the state that the suspension device 3 has been mounted on the vehicle body 1, the first rib 21 to third rib 23 formed at predetermined intervals are brought in contact with the inner circumferential surface 6b of the attachment opening 6.

Among a plurality of first rib 21 and the like, when two ribs are brought in contact with the inner circumferential surface 6b, the housing 11 is prevented from rotating, and when three ribs are brought in contact, the housing is prevented from rotating and is further prevented from having any position gap.

In the first embodiment, the housing 11 is brought in contact with the three ribs, so that the housing 11 is prevented from moving in a rotation direction about the axis L and is further prevented from having any position gap, as compared with a case where the housing 11 is brought in contact with one rib.

Further, as illustrated in FIG. 9, the second rib 22 and third ribs 23 formed in pair in the longitudinal direction of the vehicle are brought in contact with the inner circumferential surface 6b of the attachment opening 6, having the first rib 21 therebetween at the same distance therefrom. In a state that the damper mount 10 us mounted, the second rib 22 and third rib 23 press the inner circumferential surface 6b in opposite directions with respect to the longitudinal direction.

Accordingly, the upper portion 3a of the suspension device 3 is prevented from moving in the longitudinal direction with respect to the vehicle body 1.

As illustrated in FIG. 10, the contact surface 16a in the first embodiment is set to have an attachment angle so as to diagonally intersect the axis L of the housing 11 at the same angle α as the lower surface 6a of the circumferential edge. Therefore, the contact surface 16a is overlaid in parallel with the lower surface 6a of the circumferential edge, to further improve accuracy of positioning so as to increase assembling efficiency.

In other words, in the first embodiment, when the housing 11 is inserted upward of the vehicle from the lower surface 6a of the seat surface 5 as illustrated in FIG. 7, a relatively higher portion of the stay 15 inclined at the predetermined angle α is brought in contact with the lower surface 6a as illustrated in FIG. 8.

The relatively higher portion of the stay 15 moves by a reaction force while sliding in contact with the lower surface 6a to press the housing 11. Therefore, the suspension device 3 is rotated in a circumferential direction C.

Accordingly, as illustrated in FIG. 9, the bolt insertion holes 17 are aligned with the bolt fastening holes 7, respectively, and as illustrated in FIG. 10, the end of the bolt 30 is easily inserted in the bolt insertion hole 17 and the bolt fastening hole 7.

In this state, the contact surface 16a and the lower surface 6a of the circumferential edge, being inclined at the same angle α, overlap in parallel with each other.

Therefore, accuracy of positioning is further improved at the time of screwing the nuts 40 onto the bolts 30, to facilitate assembling.

Second Embodiment

When a vehicle travels in rainy weather or dew condensation occurs, water (moisture) may come into an engine room. In this case, the water (moisture) coming into the engine room may accumulate on the damper mount, causing the damper mount to be corroded.

The second embodiment is to solve the problem described above to provide a damper mount which improves draining performance such that water is not accumulated thereon.

Figure 12:
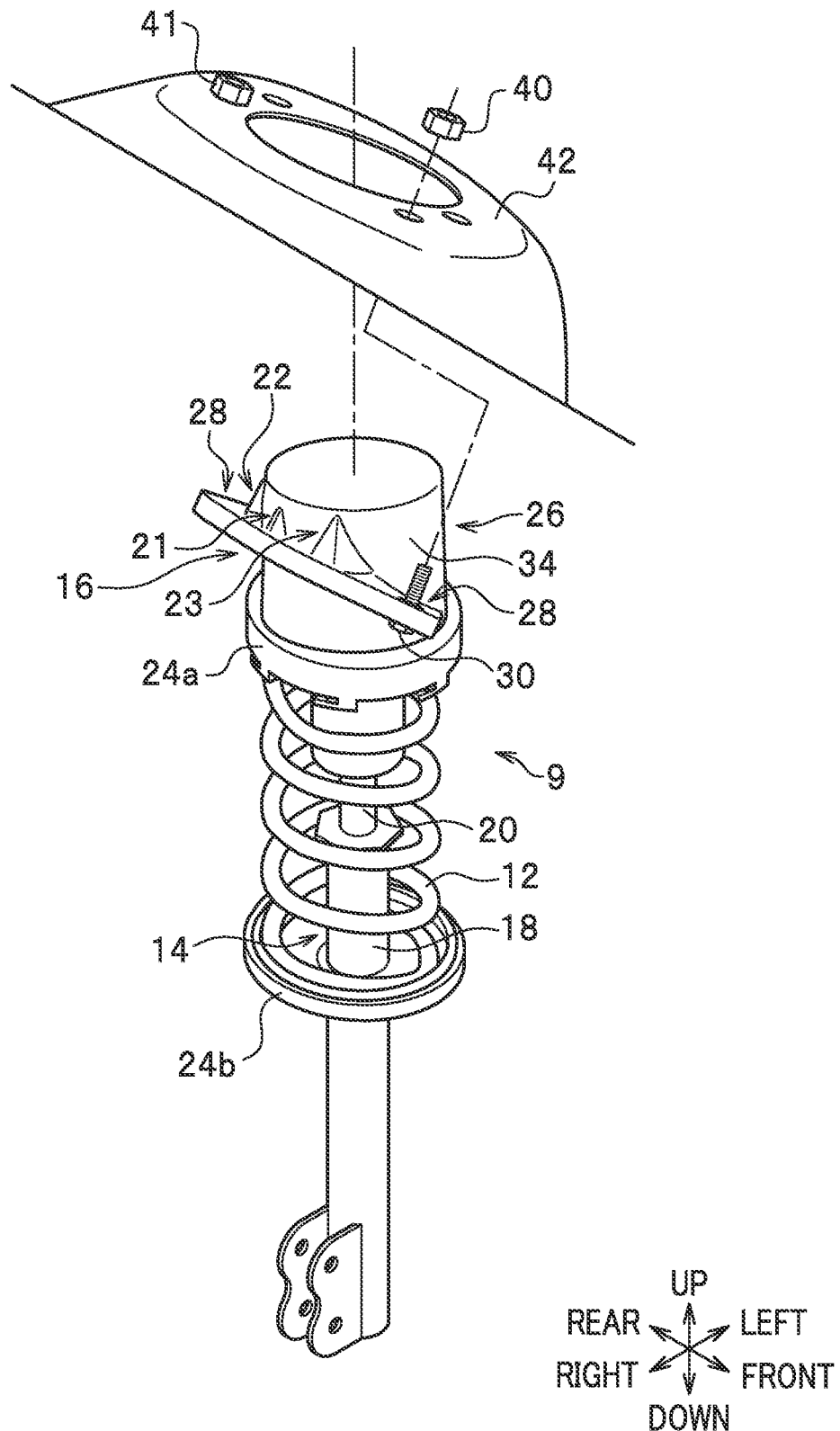
FIG. 12 is an exploded perspective view of a suspension damper assembled with a damper mount according to a second embodiment of the present invention.
Figure 13:
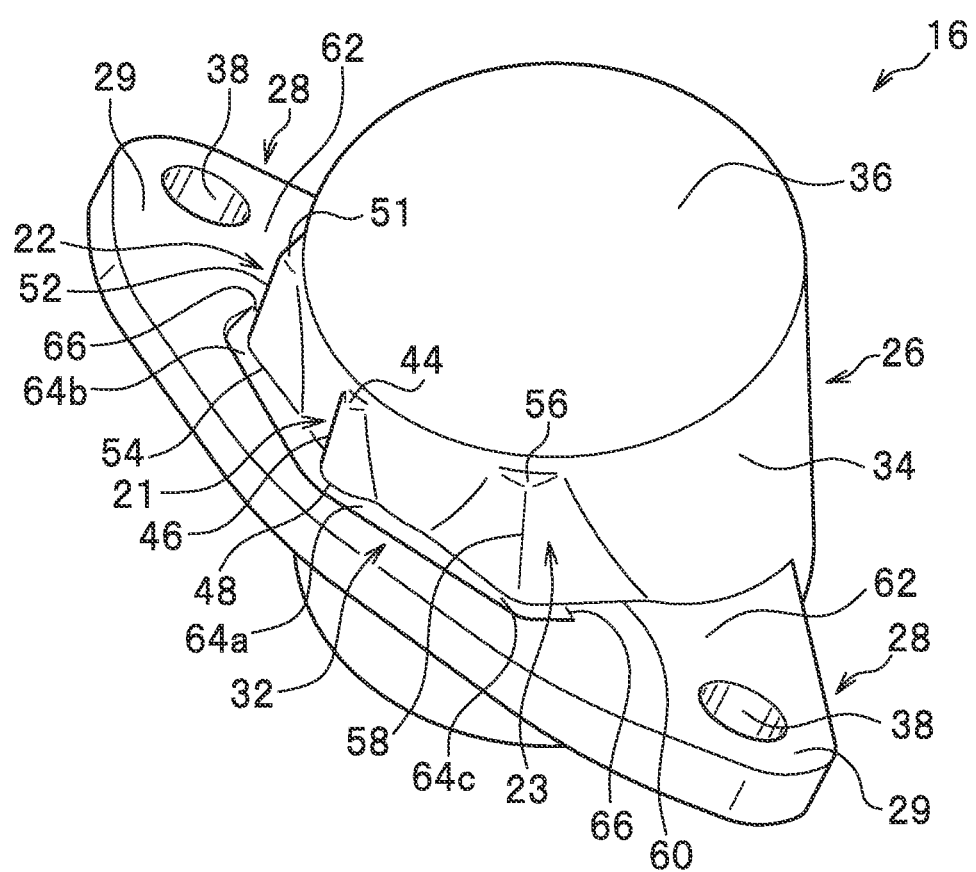
FIG. 13 is a perspective view of the damper mount illustrated in FIG. 12.
Figure 14:
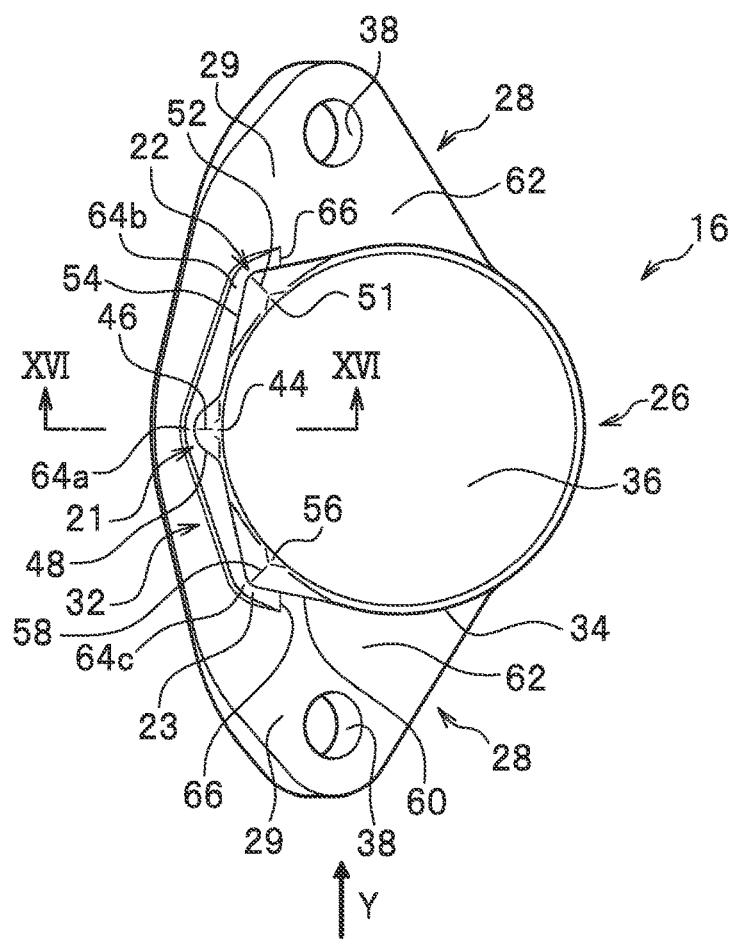
FIG. 14 is a plan view of the damper mount illustrated in FIG. 13.
Figure 15:
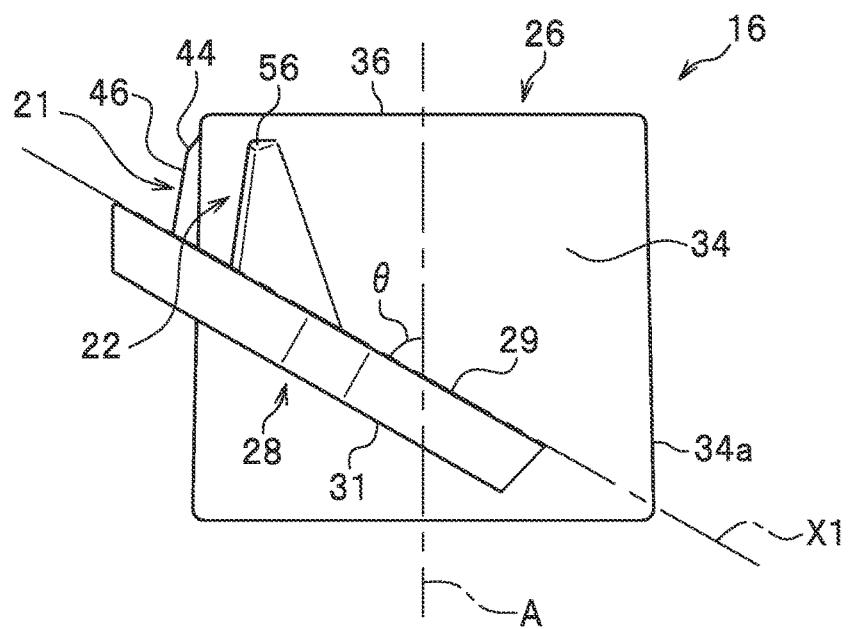
FIG. 15 is a side view as viewed from a direction indicated by an arrow Y in FIG. 14.
Figure 16:
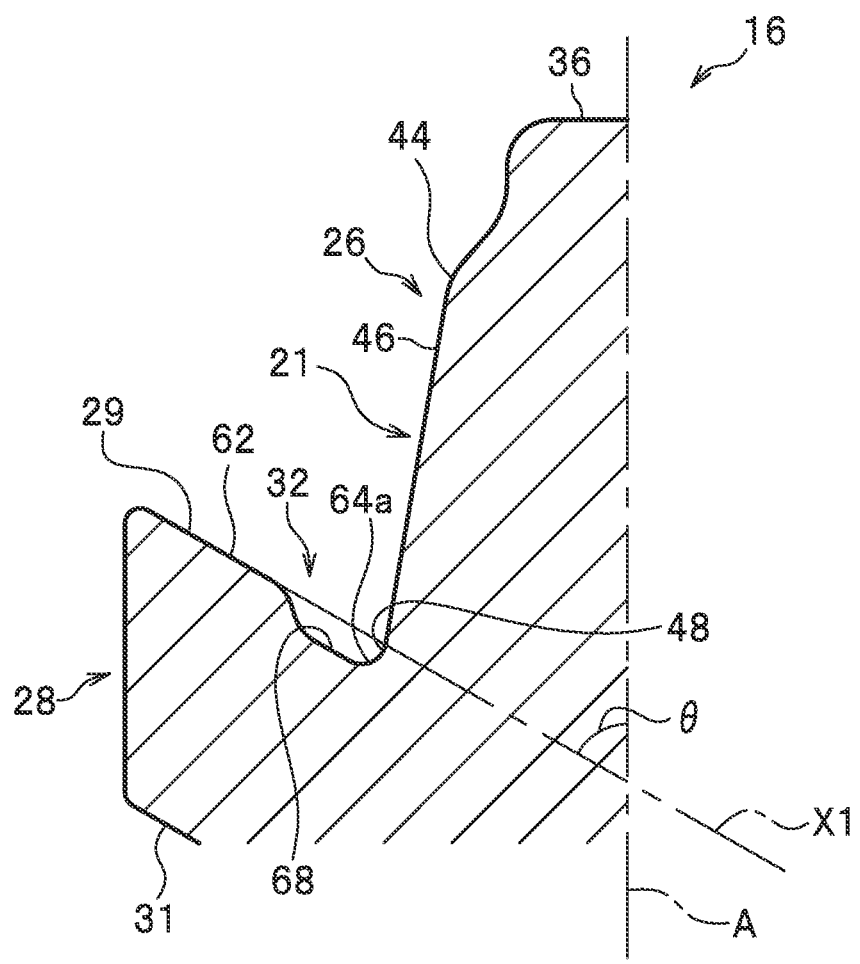
FIG. 16 is an enlarged vertical cross-sectional view taken along a line XVI-XVI in FIG. 14.
Figure 17:
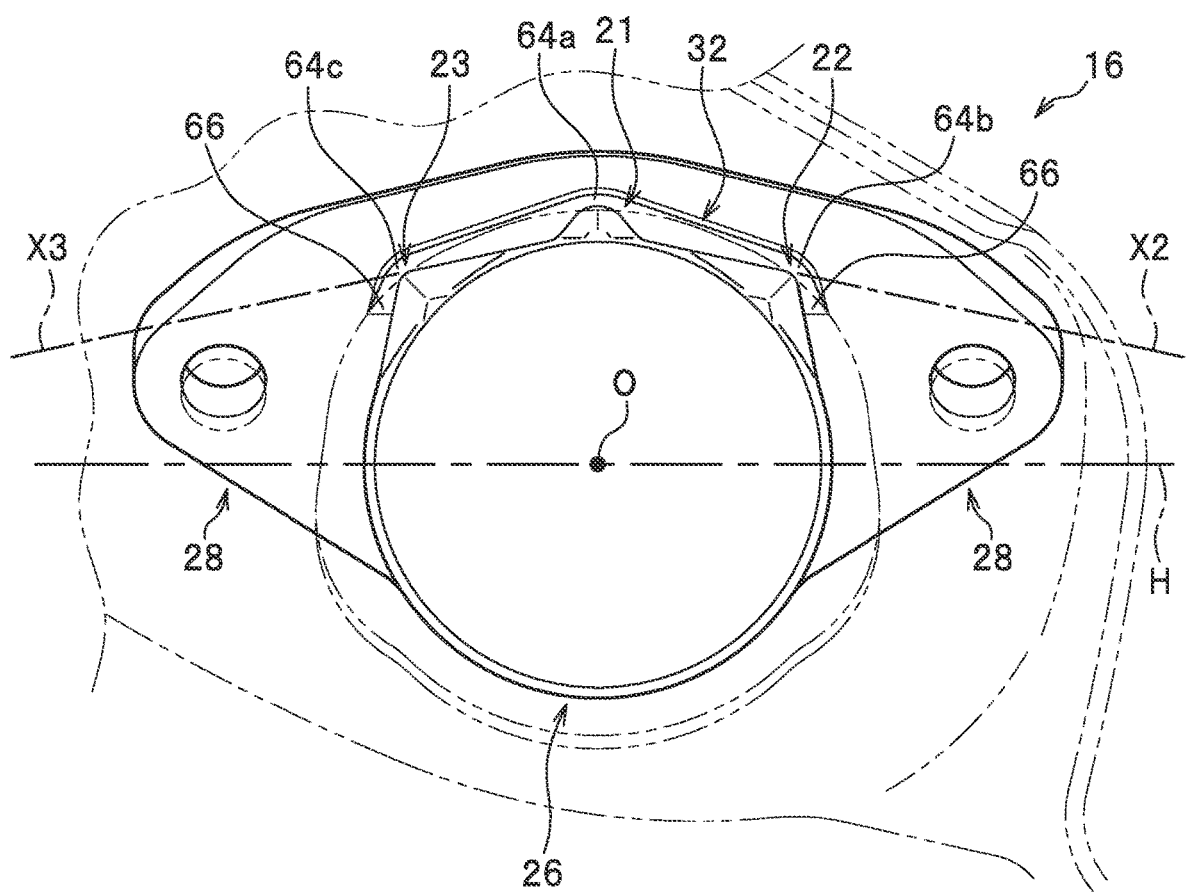
FIG. 17 is a diagram illustrating a relationship between virtual lines X2 and X3 running from a first hollow to ends of a channel forming recess and a horizontal axis H running through the center O of a base.

FIG. 12 is an exploded perspective view of a suspension damper assembled with a damper mount according to a second embodiment of the present invention, FIG. 13 is a perspective view of the damper mount illustrated in FIG. 12, FIG. 14 is a plan view of the damper mount illustrated in FIG. 13, FIG. 15 is a side view as viewed from a direction indicated by an arrow Y in FIG. 14, FIG. 16 is an enlarged vertical cross-sectional view taken along a line XVI-XVI line in FIG. 14, and FIG. 17 is a diagram illustrating a relationship between virtual lines X2 and X3 running from a first hollow to ends of a channel forming recess and a horizontal axis H running through the center O of a base.

Note that "front/rear" and "up/down" indicated by arrows in each drawing indicate the longitudinal direction and the vertical direction of the vehicle, and "right/left" indicates a right/left direction (width direction) as viewed from a driver seat.

As illustrated in FIG. 12, a suspension damper 9 includes a damper body 14 surrounded by a damper spring 12 as a coil spring and a damper mount 16 arranged at an upper portion of the damper body 14.

The damper body 14 includes a damper tube 18, a piston rod 20 accommodated in the damper tube 18, an upper spring seat 24a pressed by an upper end of the damper spring 12, a lower spring seat 24b pressed by a lower end of the damper spring 12, and the like.

Note that, in the second embodiment, the suspension damper 9 is merely an example, in which the damper tube 18 and the damper spring 12 are arranged substantially coaxially, and the present invention is not limited thereto. For example, the damper mount 16 may be applied to a suspension damper (not shown) including the damper tube 18 and the damper spring 12, having different axes from each other, arranged side by side.

As illustrated in FIGS. 13 to 15, the damper mount 16 includes a base 26, attachment portions 28, the first rib 21 to third rib 23, and a channel forming recess 32.

The base 26 has a bottomed cylindrical shape including an outer circumference 34, and is connected to an upper end of the damper body 14 (piston rod 20) (see FIG. 12). The base 26 has an upper surface 36 formed in a circular shape in a plan view (see FIGS. 14 and 15).

As illustrated in FIG. 13, the outer circumference 34 of the base 26 includes a pair of attachment portions 28 protruding from the base 26 toward opposite directions to each other. Each attachment portion 28 is formed of a flat plate having a substantially triangular shape in a plan view and is provided to protrude outward from the outer circumference 34 of the base 26.

Each attachment portion 28 has a bolt insertion hole 38 penetrating therethrough, and the suspension damper 9 is attached to a strut tower (vehicle body) 42 (see FIG. 12) with bolts 30 inserted through the bolt insertion holes 38 and nuts 40, 41. Note that the attachment portions 28 are not limited to have a substantially triangular shape in a plan view and may have a quadrangular shape in a plan view, for example.

As illustrated in FIG. 15, a virtual line X1 running through an upper surface 29 of each attachment portion 28 is set to incline by a predetermined angle θ with respect to an axis A (same as an axis A to be described below) of the base 26 in a side view.

That is, the virtual line X1 running through the upper surface 29 of each attachment portion 28 is inclined downward from a side formed with the first rib 21 toward an outer circumference 34a opposite to the first rib 21 (see FIG. 15). Thus, the upper surface 29 of the attachment portion 28 forms an inclined surface to incline from the side formed with the first rib 21 toward the outer circumference 34a opposite to the first rib 21 (see FIG. 4).

As shown in FIG. 13, the first rib 21 to third rib 23 bulge radially outward from the outer circumference 34 of the base 26 and extend from an upper portion of the outer circumference 34 of the base 26 to the attachment portions 28. The ribs include the first rib 21 formed in the center, and the second rib 22 and third ribs 23 arranged on both right and left sides in a circumferential direction having the first rib 21 therebetween. Note that, in the second embodiment, the first rib 21 to third rib 23 are illustrated as a plurality of ribs, but the number and shape of the ribs are not limited thereto.

As illustrated in FIG. 13, the first rib 21 has a substantially semicircular shape in a plan view (see FIG. 14) and includes a top 44 bulging from the outer circumference 34 slightly below the upper surface 36 of the base 26, a first ridge 46 inclined downward from the top 44 toward the attachment portion 28, and a skirt 48 which gradually spreads from the top 44. Note that the first rib 21 is not limited to a substantially semicircular shape in a plan view and may have a substantially triangular shape in a plan view, for example.

As illustrated in FIG. 13, the second rib 22 has a substantially isosceles right triangle shape in a plan view (see FIG. 14) and includes a top 51 bulging from the outer circumference 34 slightly below the upper surface 36 of the base 26, a second ridge 52 inclined downward from the top 51 toward the attachment portion 28, and a wide skirt 54 spread along the circumferential direction of the outer circumference 34 than the skirt 48 of the first rib 21.

The third rib 23 is, as an example, formed to be symmetrical with the second rib 22, for example, As illustrated in FIG. 13, the third rib 23 has a substantially isosceles right triangle shape in a plan view (see FIG. 14) and includes a top 56 bulging from the outer circumference 34 slightly below the upper surface 36 of the base 26, a third ridge 58 inclined downward from the top 56 toward the attachment portion 28, and a wide skirt 60 spread wider along the circumferential direction than the skirt 48 of the first rib 21.

Note that the second rib 22 and third rib 23 are not limited to have a substantially isosceles triangle shape in a plan view and may have other shapes.

The channel forming recess 32 is formed at a boundary between the base 26 and the upper surface 29 of the attachment portions 28. The channel forming recess 32 is continuously formed from the first rib 21 formed in the center to the adjacent second rib 22 and third rib 23 formed on right and left sides.

Intersections between the first rib 21 to third rib 23 and the attachment portions 28 are formed with a plurality of hollows recessed toward lower surfaces 31 of the attachment portions 28, as compared with general portions 62. The plurality of hollows are formed of a first hollow 64a to third hollow 64c formed to be close to the first rib 21 to the third rib 23, respectively. The channel forming recess 32 is formed by the first to third hollows 64a to 64c connected with each other, respectively, for coupling.

As illustrated in FIG. 17, the virtual line X2 from the first hollow 64a close to the first rib 21 formed in the center to one end 66 of the channel forming recess 32 is inclined with respect to (intersects) the horizontal axis H running through the center O of the base 26. That is, the virtual line X2 connecting the first hollow 64a, the second hollow 64b, and the one end 66 of the channel forming recess 32 is inclined with respect to (intersects) the horizontal axis H running through the center of the base 26. Further, the virtual line X3 connecting the first hollow 64a, the third hollow 64c, and the other end 66 of the channel forming recess 32 is inclined with respect to (intersects) the horizontal axis H running through the center of the base 26.

As illustrated in FIG. 16, note that a bottom surface 68 of the channel forming recess 32 is formed substantially in parallel with the upper surface 29 of each attachment portion 28 inclined by the predetermined angle θ with respect to the axis A of the base 26 and formed of an inclined surface inclined downward toward the outer circumference 34 of the base 26.

Further, in the second embodiment, FIG. 12 illustrates a case where the first rib 21 to the third rib 23 are formed to face outward in the width direction as one example, but the present invention is limited thereto. The first rib 21 to third rib 23 may be arranged at any positions around the outer circumference 34 of the base 26, such as a case where the ribs are formed to face inward in the width direction or formed to face frontward or rearward.

The suspension damper 9 assembled with the damper mount 16 according to the second embodiment is basically formed as described above, and advantageous effects thereof are described below.

Figure 18:
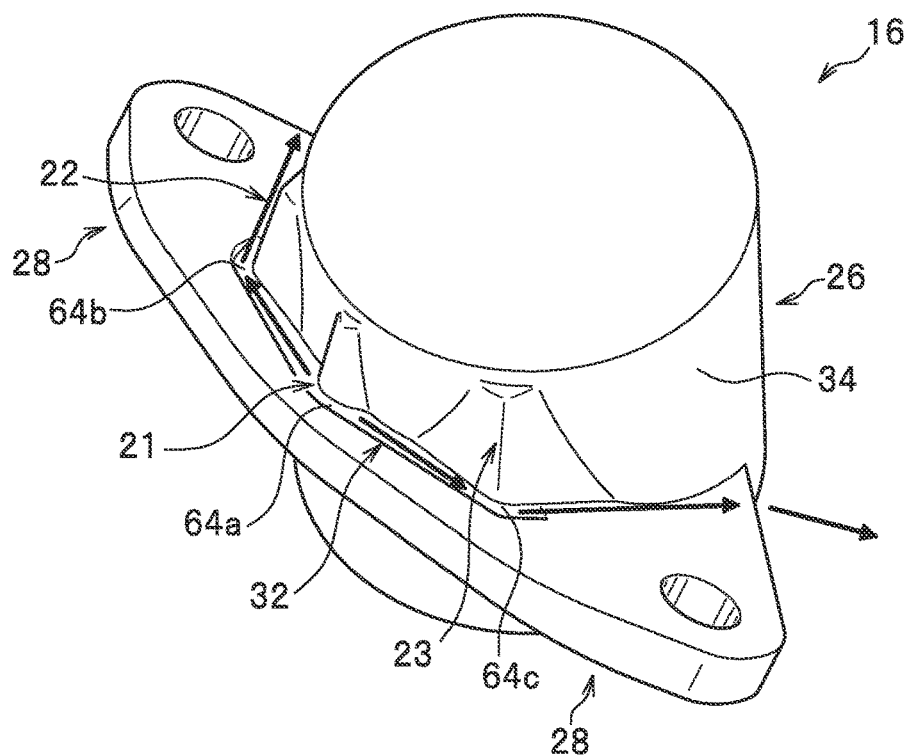
FIG. 18 is a diagram to illustrate water flowing along the channel forming recess, as viewed from diagonally above.
Figure 19:
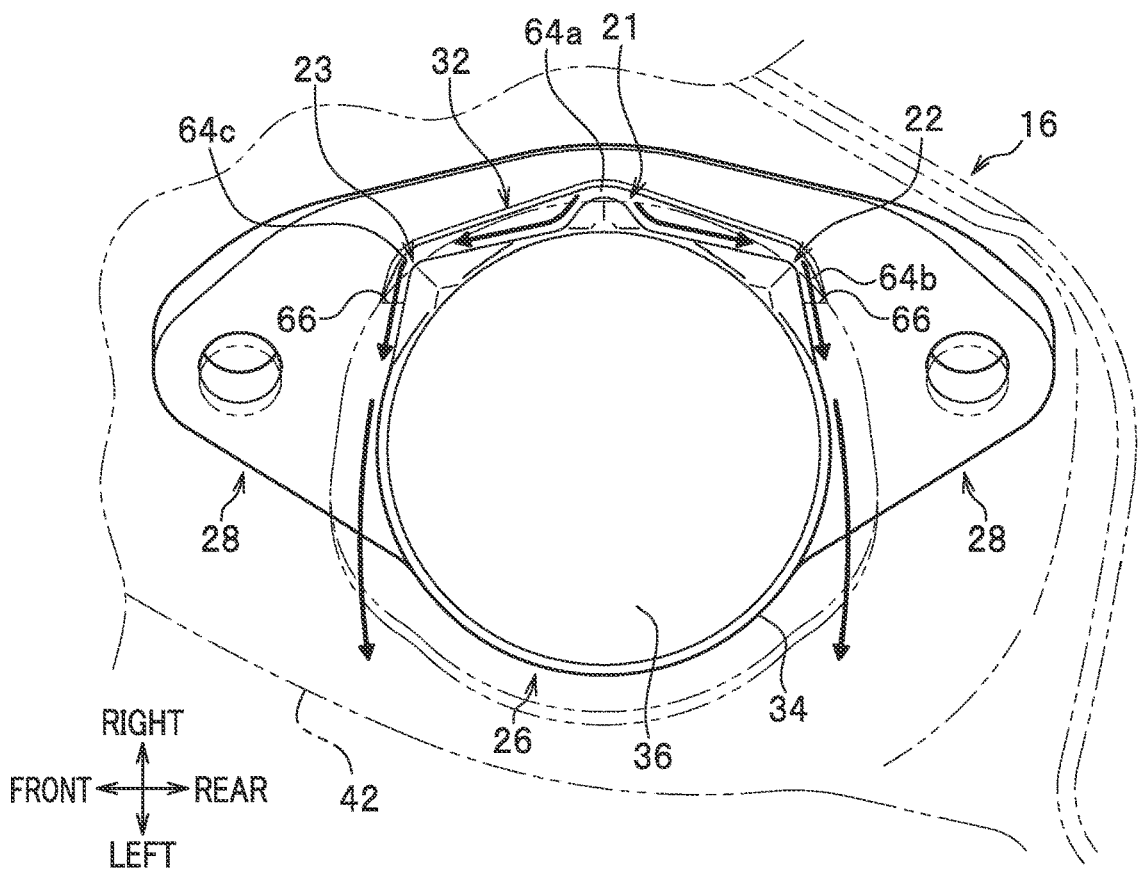
FIG. 19 is a diagram to illustrate water flowing along the channel forming recess, as viewed from above.

FIGS. 18 and 19 are diagrams to illustrate water flowing along the channel forming recess. Note that, in FIGS. 18 and 19, thick line arrows indicate water flow directions (drain directions).

In the second embodiment, the channel forming recess 32 is formed at the boundary between the base 26 and the attachment portions 28. The channel forming recess 32 is continuously formed from the first rib 21 in the center to the adjacent second rib 22 and third rib 23 formed on right and left sides.

With the structure, in the second embodiment, even when water (moisture) comes into an engine room due to a vehicle traveling in rainy weather or dew condensation, or water (moisture) comes from a bottom surface (a suspension) of the vehicle, for example, the water (moisture) is made to flow along the channel forming recess 32 (see FIGS. 18 and 19) so as to be drained to an outside from the damper mount 16, to have improved draining performance. As a result, in the second embodiment, the water (moisture) coming into the engine room is prevented from accumulating on the upper surface 29 of the attachment portions 28 to suitably prevent the damper mount from being corroded.

In the second embodiment, even when the first rib 21 to third rib 23 are formed in the outer circumference 34 of the base 26, water (moisture) is prevented from accumulating in the hollows defined by forming the ribs or spaces between the adjacent ribs, to suitably prevent the damper mount from being corroded.

Further, in the second embodiment, the first to third hollows 64a to 64c are formed at the intersections between the first rib 21 to third rib 23 and the attachment portions 28, respectively, and the channel forming recess 32 is formed to connect the first to third hollows 64a to 64c, respectively.

This allows, in the second embodiment, water (moisture) to be drained smoothly to the outside along the channel forming recess 32 formed to connect the first to third hollows 64a to 64c.

Further, in the second embodiment, the virtual line (X1) running through the upper surface 29 of the attachment portions 28 is set to incline by the angle θ with respect to the axis (A) of the base 26 (see FIG. 15). The virtual lines (X2, X3) running from the first hollow 64a close to the first rib 21 located in the center to the ends 66 of the channel forming recess 32 are inclined with respect to the horizontal axis (H) running through the center of the base 26 (See FIG. 17).

In the second embodiment, the virtual line (X1) running through the upper surface 29 of the attachment portions 28 is inclined by a predetermined angle with respect to the axis (A) of the base 26, to allow water (moisture) flowing along the channel forming recess 32 to be flowed downward on the inclined upper surface 29 of the attachment portion 28. This further improves performance of draining water (moisture) accumulated on the upper surface 29 of the attachment portion 28.

In the second embodiment, the virtual lines (X2, X3) running from the first hollow 64a to the ends 66 of the channel forming recess 32 are inclined with respect to the horizontal axis (H) running through the center of the base 26, to promote water (moisture) flowing along the channel forming recess 32.

The present invention is not limited to the first and second embodiments described above and may be modified variously. The first and second embodiments described above are exemplified for easy understanding of the present invention and are not necessarily limited to the structures including all the elements described above. Further, a portion of the structure of one embodiment may be replaced with a structure of another embodiment, or a structure of one embodiment may be added to a structure of another embodiment. Still further, a portion of the structure of each embodiment may be deleted. Modifications of the embodiments described above are as follows, for example.

In the first and second embodiments, the damper mount attachment structure of the suspension device 3 and the damper mount have been described, which are used for the right front wheel of the vehicle body 1, but the present invention is not particularly limited thereto. For example, the damper mount attachment structure of the suspension device 3 and the damper mount may be applied to the left front wheel, right rear wheel, or left rear wheel, and elements and the number thereof to be used are not particularly limited by the descriptions of the first and second embodiments.

Further, the first rib 21 to third rib 23 are formed in the first and second embodiments. The second rib 22 and the third rib 23 are formed in pair in the longitudinal direction, having the first rib 21 therebetween at the same distance therefrom. However, the ribs are not particularly limited thereto. For example, the first rib 21 and the like may be used alone, may be formed in two or more pairs, or a plurality of ribs may be formed at intervals.

That is, as long as the ribs connect the stay 15 to the outer circumferential surface 11a of the housing 11 and have the side surface 21a and the like facing the inner circumferential surface 6b of the attachment opening 6, the shape, the number, and material of the ribs are not specifically limited. Note that addition of ribs would improve accuracy of positioning. Making the side surface 21a and the like face in parallel with the inner circumferential surface 6b of the attachment opening 6 would further improve accuracy of positioning.

Further, in the first and second embodiments, the first rib 21 to third rib 23 protrude outward in the radial direction of the housing 11 and include the side surfaces 21a, 22a, and 23a to face, so as to be in parallel here with, the inner circumferential surface 6b of the attachment opening 6 (see FIG. 11). However, the ribs are not particularly limited thereto, and may face at any angle rather than being in parallel, for example, as long as the ribs face the inner circumferential surface 6b.

Further, the side surfaces 21a, 22a, and 23a each present a tapered shape and are connected with each other. However, the side surfaces are not particularly limited thereto, and may not be formed in a tapered shape as long as the side surfaces 21a, 22a, and 23a face the inner circumferential surface 6b. Still further, the side surfaces may have any inclination angle and are not necessarily inclined, for example. Yet further, the side surface 21a may be combined with inclined surfaces having different inclination angles.

Further, as illustrated in FIG. 10, the contact surface 16a of the first embodiment is inclined downward and inward in the width direction (In direction) at the same angle α as the inclination of the lower surface 6a of the seat surface 5 of the suspension attachment 2 so as to diagonally intersect the axis L of the housing 11, but the contact surface is not limited thereto. The contact surface may be inclined outward in the width direction (Out direction), and may be inclined downward in any direction such as the longitudinal direction.

REFERENCE NUMERALS

1: vehicle body; 3: suspension device (suspension); 3a: upper portion; 6: attachment opening; 6a: lower surface; 6b: inner circumferential surface; 10: damper mount; 11: housing; 11a: outer circumferential surface; 15: stay (attachment portion); 21 to 23: first rib to third rib; 21a to 23a: side surface.

What is claimed is:

1. A damper mount attachment structure comprising a damper mount for fixing an upper portion of a suspension to an attachment opening formed in a vehicle body;
    wherein the damper mount includes:
    a base to be mounted on the upper portion of the suspension;
    an attachment portion which protrudes from an outer circumferential surface of the base and is brought in contact with a lower surface of a circumferential edge of the attachment opening in a state that the base has been inserted through the attachment opening to attach the base to the circumferential edge of the attachment opening; and
    a rib which extends between and continuously connects the attachment portion and an outer circumferential surface of the base,
    wherein the rib includes a side surface facing an inner circumferential surface of the attachment opening, and
    wherein a flat contact surface and a recess formed by recessing the flat contact surface downward therefrom are formed on an upper surface of the attachment portion.

2. The damper mount attachment structure as claimed in claim 1, wherein a plurality of ribs are formed in the outer circumferential surface of the base on an outer side in a width direction with respect to an axis of the base.

3. The damper mount attachment structure according to claim 2, wherein at least a pair of ribs are formed in a longitudinal direction.

4. The damper mount attachment structure as claimed in claim 1, wherein the flat contact surface of the attachment portion is formed to incline at a same angle, intersecting an axis of the base, as a lower surface of a peripheral edge of the attachment opening.

5. A damper mount used for the damper mount attachment structure as claimed in claim 1,
    wherein the damper mount includes a plurality of ribs which bulge radially outward from an outer circumference of the base and extend from an upper portion of the outer circumference of the base to the attachment portion, and
    a channel forming recess which is formed at a boundary between the base and the attachment portion,
    wherein the channel forming recess is continuously formed from a rib of the plurality of ribs located in the center to adjacent ribs located on a right side and a left side.

6. The damper mount as claimed in claim 5,
    wherein a plurality of hollows are formed at intersections between the ribs and the attachment portion, and
    the channel forming recess is formed by the plurality of hollows connected with each other.

7. The damper mount as claimed in claim 6,
    wherein a virtual line (X1) running through an upper surface of the attachment portion is inclined by an angle θ with respect to an axis of the base, and
    virtual lines (X2, X3) running from the hollow close to the rib located in the center to ends of the channel forming recess are inclined with respect to a horizontal axis (H) running through a center of the base.

8. The damper mount attachment structure as claimed in claim 1, wherein the rib protrudes from the outer circumferential surface of base and is configured to face an inner circumferential surface of the attachment opening and to be brought into contact with the inner circumferential surface of the attachment opening in the state that the base has been inserted through the attachment opening to attach the base to the circumferential edge of the attachment opening.

* * * * *